United States Patent

[11] 3,582,893

[72] Inventor Sigurd G. Waaben
Princeton, N.J.
[21] Appl. No. 779,809
[22] Filed Nov. 29, 1968
[45] Patented June 1, 1971
[73] Assignee Bell Telephone Laboratories, Incorporated
Murray Hill, Berkeley Heights, N.J.

[54] SELECTIVE SWITCHING MATRIX CONFIGURATION HAVING SAME INDUCTANCE AT EACH DRIVING POINT
19 Claims, 6 Drawing Figs.

[52] U.S. Cl. .......... 340/166, 340/167
[51] Int. Cl. .......... H04q 3/00
[50] Field of Search .......... 340/166

[56] References Cited
UNITED STATES PATENTS
3,492,651 1/1970 Genke .......... 340/166

*Primary Examiner*—Harold I. Pitts
*Attorneys*—R. J. Guenther and Kenneth B. Hamlin

ABSTRACT: The two sets of rail circuits of a selective switching matrix are arranged in parallel arrays extending colinearly in substantially the same plane. Their cross-point interconnecting circuits are each coupled between points of their respective rail circuits which are spaced from the driving points of such rail circuits by complementary distances totaling a predetermined magnitude which is the same for all of the interconnecting circuits. Such interconnecting circuits are also of equal extent so that equal circuit path lengths are included between any pair of driving points for said first and second sets of rail circuits. Particular matrix configurations utilizing integrated circuit techniques to advantage are also shown.

INVENTOR
S. G. WAABEN

BY

*Charles Scott Phelan*
ATTORNEY

SELECTIVE SWITCHING MATRIX CONFIGURATION HAVING SAME INDUCTANCE AT EACH DRIVING POINT

BACKGROUND OF THE INVENTION

1. Field of the Invention

This invention relates to selective circuit interconnection arrangements and particularly to such arrangements which are characterized by substantially uniform inductance for the various interconnection paths.

2. Description of the Prior Art

A problem frequently faced in organizing circuit interconnection arrangements is the one of realizing different combinations of circuit connection without a resulting effective differential path length through the various interconnections, particularly for circuit pairs that must have comparatively widely separated circuit conductors. In the latter circumstances the different path lengths represent corresponding different enclosed circuit loop areas with consequent differential inductive loading and transmission delay for the respective interconnected circuit pairs.

It is known in the prior art to adjust circuit impedances for a connection matrix so that all possible conductor pair paths that are selectable have the same characteristic impedance. A driver applying signals to such a selection circuit is subjected to substantially the same loading regardless of the transmission path selected through the interconnection arrangements. However, by so utilizing the characteristic impedance, a transmission line effect is necessarily produced whereby the selectable interconnection paths have widely differing inductances and thus widely differing transmission delays. Such delays are in themselves troublesome in many circuit applications, e.g., access matrices for a memory arrangement, because the aforementioned delays prevent memory output signals from being produced at uniformly predictable times. More importantly, however, such transmission line arrangements swamp out the basic circuit inductances by much larger reactances and require comparatively high drive voltages. The matrix is then unable to operate at high speeds of which some magnetic devices are capable.

It is also known in the art to employ in conductor pair paths twisted wire pairs, or at least closely adjacent conductor pairs, to minimize circuit inductance and thus reduce the possible extent of inductive loading differences resulting from different path lengths. However, it is not always possible to employ such closely associated conductor pairs. For example, in a selective switching matrix which is arranged on a rectangular coordinate basis it is usually necessary to involve only one conductor of a pair in the matrix and to provide a separate common ground return circuit for all possible matrix current paths. Thus, wide variations are possible in the enclosed circuit loops of different matrix paths.

It is, therefore, one object of the invention to improve electric circuit interconnection arrangements.

It is another object to reduce the differential inductance in different circuit paths through a selective switching matrix.

A further object is to reduce signal transmission delay differentials for different circuit paths through a selective interconnection circuit arrangement.

Still another object is to achieve a planar matrix structure to which multiple electric circuit bonds can be simultaneously made for ease of manufacture.

Yet another object is to separate circuit crossover and diode connection technologies for facilitating diode matrix manufacturing.

SUMMARY OF THE INVENTION

The aforementioned and other objects of the invention are realized by arranging circuits which are to be interconnected in two circuit sets and interconnecting each circuit of one set to all circuits of the other set through interconnection circuit loops which all enclose substantially the same area.

It is one feature of the invention that the interconnected circuits are arranged in a planar form which facilitates manufacture. In one embodiment the circuits are secured to a flexible substrate sheet and cross-point diodes in the selection matrix are also secured to that substrate.

Another feature is that circuit crossovers are in one compact area of the substrate and cross-point diodes are in at least one other remotely located area of the substrate.

A further feature is that each of the mentioned circuit loops is connected to a pair of circuits from the two circuit sets at points thereon which are complementary circuit distances from the respective driving points of the circuits of the pair with respect to a predetermined distance that is the same for all paths from which a selection is to be made.

BRIEF DESCRIPTION OF THE DRAWING

A more complete understanding of the invention and its various features, objects, and advantages may be obtained from a consideration of the following description in connection with the appended claims and the attached drawing in which:

DETAILED DESCRIPTION

Figure 1:
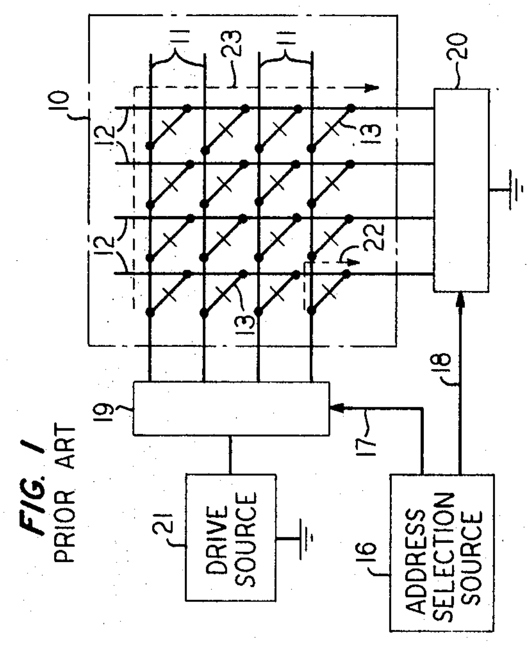
FIG. 1 PRIOR ART
FIG. 1 is a schematic diagram of a diode selection switching matrix that is typical of prior art arrangements.

A typical prior art circuit interconnection system is illustrated in FIG. 1 and includes a diode access matrix 10 with row circuits 11 and column circuits 12 arranged to form a coordinate matrix of intersecting circuits. It will be observed that each circuit intersection comprises a circuit crossover without connection, and two circuit connections for the cross-point load circuits. An improved matrix arrangement is taught in a copending application of T. R. Finch and S. G. Waaben, Ser. No. 591,237, filed Nov. 1, 1966, and now U.S. Pat. No. 3,484,764; but it also has intermeshed circuit crossover and diode connection technologies. Cross-point load circuits 13 interconnect each row circuit to each different one of the column circuits and include unilateral conducting means of a form well known in the art and a series-connected load circuit not specifically shown. The cross-point load circuits 13 are schematically represented by connections between row and column circuits which include a short diagonal line to indicate the unilateral conduction characteristic.

An address selection source 16 provides address-defining signals which are coupled by way of circuits 17 and 18 to matrix coordinate selection switches 19 and 20. In a typical arrangement the source 16 is advantageously a data processor which translates address information for a memory associated with matrix 10, but not otherwise shown, and such information is represented on a one-out-of-*n* basis for row and column selection, respectively. The signals thus provided via the circuits 17 and 18 actuate a selected one of the row switches 19 and a selected one of the column switches 20 for completing an electric current path across the output of a drive signal source 21.

In FIG. 1 one terminal of the source 21 is applied through the row selection switches 19 to a selected row circuit 11, through one of the cross-point load circuits 13, to the selected column circuit and its associated selection switch 20, and through a ground return path back to the source 21. Broken-line arrows 22 and 23 in FIG. 1 indicate two possible circuit paths which could be selected through the matrix 10 and which have quite different path lengths. Each of those paths comprises part of a different circuit loop connectable across the output of drive source 21. Paths 22 and 23 enclose substantially different areas; and, for that reason, they have substantially different inductances. Such different inductances constitute load variations for the source 21 for the different selected paths as well as representing differential delay or time jitter in the transmission of drive pulses from the matrix.

Figure 2:
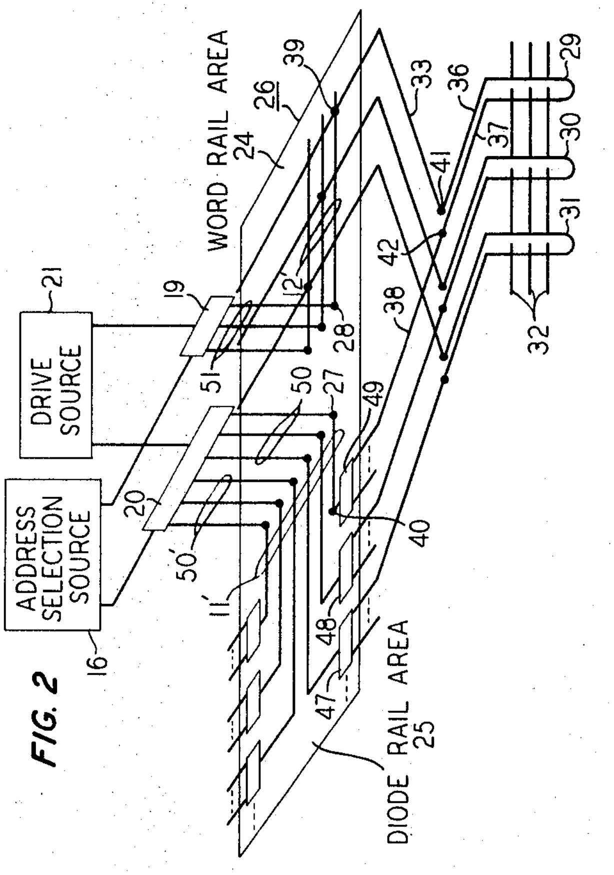
FIG. 2 is a simplified schematic diagram of an interconnection circuit in accordance with the present invention and as applied to a diode selection matrix.

In FIG. 2 is shown a form of matrix arrangement which reduces the circuit path length inequalities through the matrix while providing substantially equal inductance for all selectable paths. A greatly simplified and expanded form is depicted to facilitate an understanding of the various circuit relationships. Corresponding circuit elements in the figure are designated by reference characters which are similar to those employed in FIG. 1. In FIG. 2 the row and column circuits of the matrix are separated into two circuit sets that extend in two, parallel, circuit areas 24 and 25 which are advantageously substantially colinearly arranged with respect to one another. Thus, the areas 24 and 25 comprise opposite halves of the same plane 26. The plane 26 schematically represents a flexible substrate tape with circuits secured thereto in a manner which is known in the art and is not part of the present invention. The particular circuit relationship for a full tape carrying the selection matrix and its cross-point load circuits will be considered subsequently in connection with FIG. 3.

In the embodiment of FIG. 2 the circuits of one set are hereinafter designated the word rail circuits 12' and correspond to the column circuits of FIG. 1. Similarly, the second set of matrix circuits is herein designated the diode rail circuits 11' and corresponds to the row circuits 11 of FIG. 1. All of the circuits 11' and 12' are illustrated in the same plane 26. Cross-point diodes grouped in common circuit chips such as the chips 47—49 connect the diode rail circuits 11' to load circuits. The chips are discussed in greater detail in connection with FIG. 4 and include cross-point diodes such as the diodes 13' in FIG. 4 which correspond to diodes in the cross-point load interconnections 13 of the matrix in FIG. 1.

Each of the diode rails 11' in FIG. 2 includes at one end thereof a drive point 27 at which the diode rail circuit is connected by a lead of the upwardly extending leads 50 to the diode rail selection switches 20. Similar drive points 28 are included at the ends of the word rails 12' and are connected by vertically extending leads 51 to the word rail selection switches 19. In word rail area 24 of plane 26 transverse connections are provided for the word rails 12' and extend to opposite edges of the plane 26. At the edges of rail areas 24 and 25 interconnecting circuits advantageously extend downward, on the same substrate, although not so shown in FIG. 2, in a particular configuration to be described to couple the aforementioned diode and word rail circuits to respective cross-point load impedances. The latter load impedances are in FIG. 2 illustrated for convenience as word solenoids 29, 30, and 31 which enfold a plurality of magnetic-material-coated digit circuits 32 of a plated wire magnetic memory of a type that is now well known in the art. One such memory is shown in the aforementioned Finch et al. application.

The foremost diode rail 11' and word rail 12', as viewed in FIG. 2, are connected together through circuit portions 33 and 36, word solenoid 29, and circuit portions 37 and 38. Circuit portions 36 and 37 are closely associated with one another and may advantageously be formed as a twisted wire pair or simply as two closely adjacent conductors. However, the circuit portions 33 and 38 are divergent and are connected to specific positions on their respective word and diode rail circuits. Those positions are spaced along the corresponding rails by distances from the respective rail driving points which are complements of one another with respect to a predetermined distance that is the same for all corresponding cross-point loads which interconnect diode rails and word rails. More specifically, the circuit portion 33 is connected to the foremost diode rail 12' at a circuit position 39 which is spaced a particular distance from the driving point 28 on the same word rail 12'. Similarly, the circuit portion 38 is connected through diode chip 49 to a circuit position 40 on the foremost diode rail 11' which is a particular distance along that rail from the driving point 27. The two electric circuit distances 40–27 and 39–28 comprise a total distance with respect to which the two mentioned distances are complements. That total distance is the same for all cross-point load interconnections, but the specific complementary parts for the different cross-point interconnections vary in accordance with the particular word or diode rail involved and the particular cross-point load that is connected to that word or diode rail. Circuit terminals 41 and 42 define the circuit interface between circuit portions 33 and 36 and circuit portions 38 and 37, respectively. Circuit terminals 41 and 42 are closely adjacent to one another and substantially equidistant in a circuit sense from their respective rail drive points 28 and 27.

A generally triangular circuit loop has been described for connecting driving points 27 and 28 to terminals 41 and 42. A similar and generally triangular circuit loop can be traced for each word rail and every one of the diode rails to which it is connected. Each such circuit loop extends from a word rail drive point in FIG. 2 through such loop and an associated memory word solenoid to a diode rail drive point. All such triangular loop circuits enclose substantially the same area because of the requirement for complementary connecting distances between rail drive points, e.g. 27 and 28, and circuit positions, e.g. 39 and 40, as hereinbefore described.

In actual practice the selection switches 19 and 20 are advantageously arranged quite close to one another so that the vertical leads, such as 51 and 50, connecting them to their respective rail drive points 28 and 29 are similarly close and present relatively low inductance to the drive source 21. Likewise, the part of the drive source load connecting circuit terminals such as 41 and 42 through circuit portions 36 and 37 to their respective word solenoids also present comparatively low inductance. The principal inductive loading imposed on the drive source 21 is then the inductance of the selected word solenoid and the loading presented by the generally triangular loop circuit associated with the selected word solenoid. Since the solenoid inductances are, to a first order of magnitude, approximately the same, and since the triangular loop inductances are substantially the same, the drive source 21 sees approximately the same inductive loading for any matrix address selected for driving the associated memory arrangement. Consequently, drive pulse rise time is substantially the same for all matrix addresses; and the delay time for transmitting such drive pulse to a word solenoid is substantially the same. These uniformities simplify the problems of memory readout circuit detection as will be readily recognized by those skilled in the art. It will also be recognized that because the drive pulses coupled to the memory from the drive pulse source 21 have the aforementioned substantially uniform rise time and magnitude, the characteristics of the magnetic material employed at storage locations in the memory can have more relaxed tolerances because it is necessary to accommodate the smaller range of drive pulse variables. These relaxed tolerances mean a significant cost advantage for manufacturing.

In FIG. 2 it will be observed that only a single solenoid is connected in the manner described to each diode rail and word rail. This simplification has been utilized for convenience in illustrating the principles of the invention. In actual practice numerous memory word solenoids in individual matrix cross-point circuits are connected to the word rails and diode rails in the manner schematically illustrated in FIG. 1 but with the electric circuit loading improvements noted in regard to FIG. 2. Thus, the word rails 12' in FIG. 2 are extended beyond their illustrated cross-point connection positions to represent schematically the utilization of such further connections. In all such further cases, which are not specifically illustrated, the rail connection positions are spaced with respect to the corresponding rail drive points in accordance with the outlined principles to obtain coupling loop circuits enclosing substantially equal areas. Furthermore, as is conventional in matrix practice, each rail circuit of one set is connected to all rail circuits of the other set, and no two pairs of rail circuits from the two sets are interconnected through more than one cross-point. Of course, the rail circuits are arranged as close as possible in both the length and width of plane 26.

The cross-point interconnection arrangements described thus far in connection with FIG. 2 have been in terms of circuits depending from the front edge of the plane 26 in that figure in the manner of a perpendicular plane. There is also advantageously provided a corresponding mirror image set of cross-point interconnection arrangements, not shown in FIG. 2, which depends in another perpendicular plane from the back edge of the plane 26. As more clearly shown in FIG. 5, each of the mentioned depending perpendicular planes is actually a folded circuit array, and the total comprises an arrangement conveniently contemplated as a folded plane with the plane 26 comprising the fold part and the depending perpendicular planes comprising the two folded halves of the folded plane. Each of the word rails 12' serves the cross-point load circuits in the arrays on both the front and the back parts of the folded plane thus formed. Consequently, the word rails in word rail area 24 are approximately at the midpoints of pairs of series-connected cross-point load circuits in the respective parts of the folded plane. These series-connected circuits terminate on different diode rails in diode rail area 25.

Figure 3:
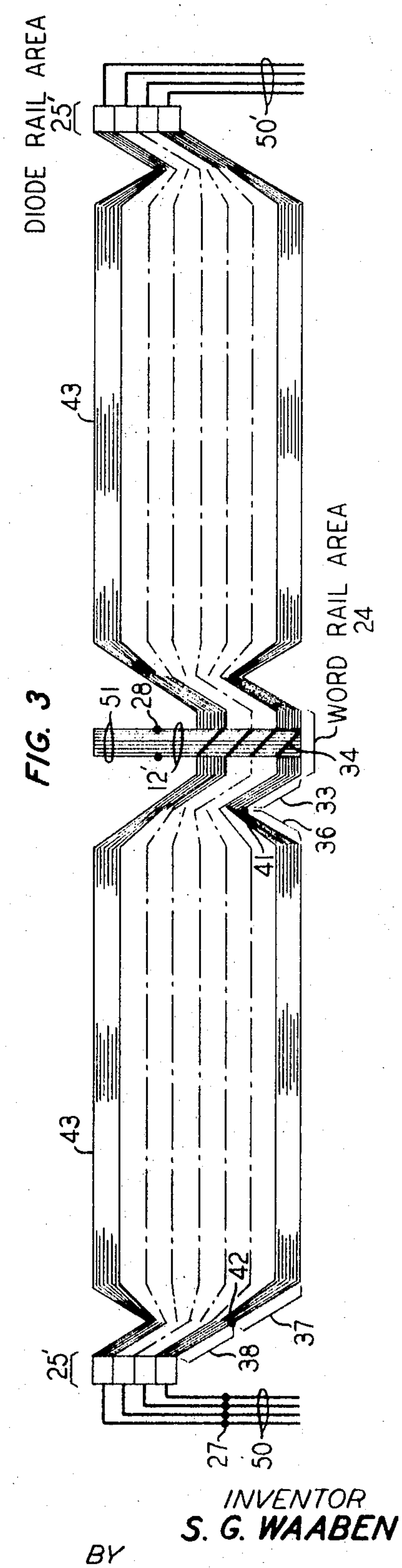
FIG. 3 is a simplified diagram of one embodiment of circuit configurations to be utilized in the matrix of FIG. 2.

It has been found that the access matrix and word solenoid array hereinbefore described in connection with FIG. 2 are advantageously manufactured in the form of a tapelike cable, and one embodiment of such a cable is illustrated in FIG. 3. The conductors of the triangular loop circuit parts in FIG. 2 and the memory word solenoids in FIG. 2 are deposited on a flexible nonconducting substrate material, not specifically indicated in FIG. 3, to form, with leads 50 and 50' and two parts 25', 25' of diode rail area 25, a major tape, or cable, 43. The substrate holds the circuits in the illustrated configurations. That cable extends symmetrically to the right and left of a second tapelike cable which includes the word rails 12' and their associated leads 51. The two cables are connected to form a unitary, substantially planar cable.

The word rails 12' lie transversely across the major tape 43 and have multiple interconnections between each word rail 12' and different ones of the circuit parts in the major tape. Thus, the cross-point load circuits each intersect at least one word rail and are each connected to only one word rail. Such multiple interconnections are schematically indicated by diagonal lines such as the diagonal line 34 in FIG. 3 in the area of intersection of the two tapes. Each intersection of a diagonal line 34 with a word rail 12' represents an electrical connection to a pair of cross-point load circuits at that point. In one embodiment 32 word rails were thus connected to 128 pairs of cross-point load circuits. These interconnections are advantageously formed as taught in U.S. Pat. No. 3,499,098, issued Mar. 3, 1970, in the names of B. H. McGahey and E. M. Woodruff and entitled "Conductor Interconnections." Thus, each diode rail 12' is connected at each diagonal line connection 34 to a different major tape circuit between diode rail area parts 25', 25'.

Those skilled in the art will appreciate that in an embodiment of the type in FIG. 3 circuit crossovers are confined to the area of the diagonal connections 34 and can be readily achieved by batch-manufacturing techniques that are most convenient for the circuit crossover and connection technology without limitation to diode connection requirements. Similarly, diodes are all in the diode area parts 25', 25' and are advantageously bonded into the circuits by batch-manufacturing techniques that are most convenient for diode-bonding technology. The particular techniques employed in either case are not a part of this invention; the important aspect here is that the two types of areas are separated so that the most advantageous technique can be used in either case substantially independently of the other case.

In FIG. 3 the left-hand portion of the major tape 43 corresponds to the circuit portions partially illustrated in FIG. 2 as depending from the front edge of the plane 26. The diode rail area 25 is divided into two diode rail area parts 25' in FIG. 3 that lie at either end of the major tape 43. Those two parts of the diode rail area are conveniently folded together, after enfolding appropriate groups of digit circuits 32 in FIG. 2, to bring the two parts together in the same plane with the word rail area 24. Vertical conductor extension portions 51 and 50 of the word rails and diode rails, respectively, are in FIG. 3 laid out in the same plane with the rest of the major tape 43.

Figures 4, 5, 6:
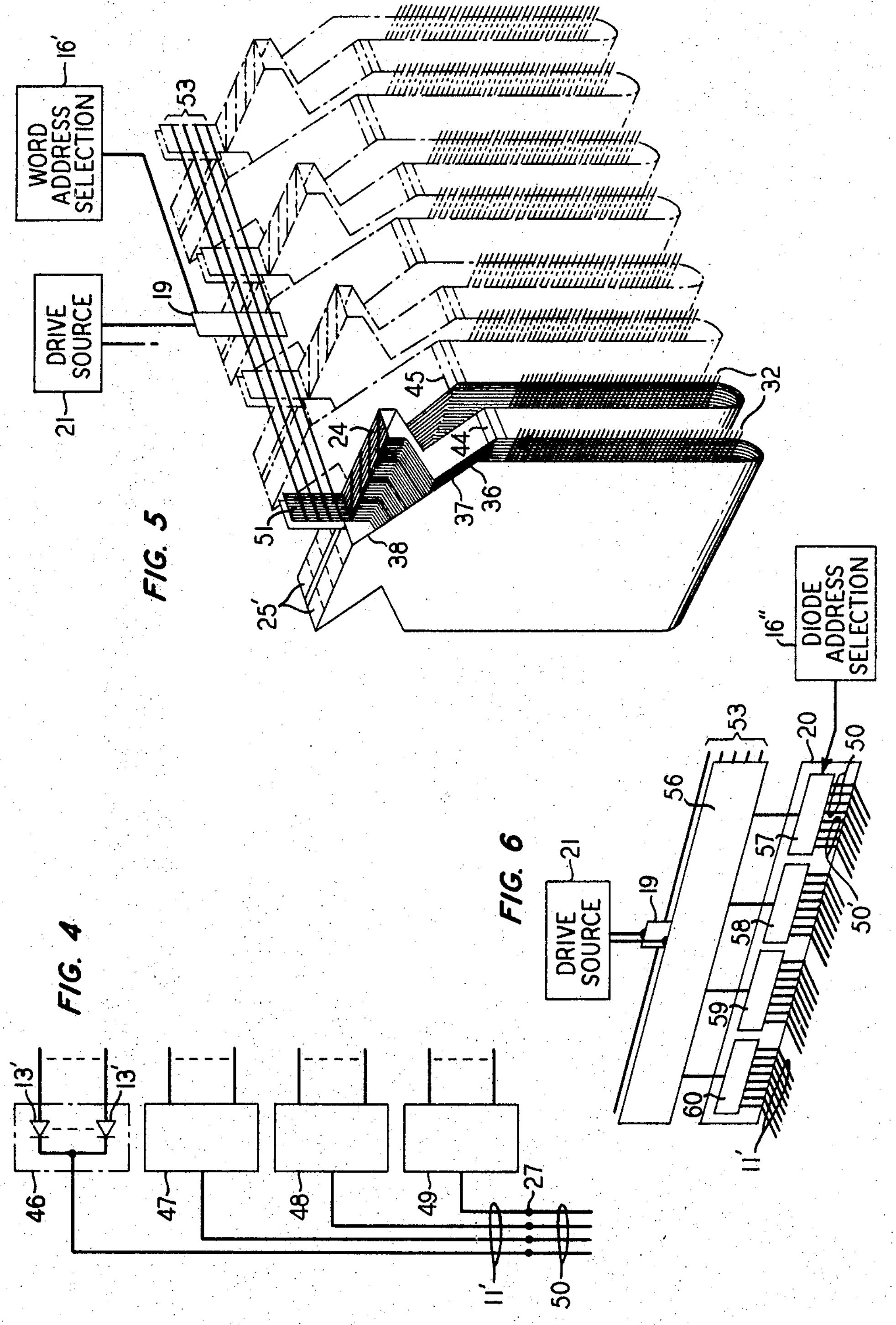
FIG. 4 is a schematic block and line diagram of a circuit concentration arrangement utilized in FIG. 3.
FIG. 5 is a simplified perspective drawing of several modules of a memory utilizing a matrix of the type illustrated in FIG. 2.
FIG. 6 is a simplified block and line diagram of a part of the access matrix system for the memory modules of FIG. 5, but which part is not visible in the perspective drawing of FIG. 5.

Each of the diode rail area parts 25' advantageously includes as a part of the cross-point circuits and diode rail circuits a circuit concentration arrangement which is advantageously formed by integrated circuit chips as illustrated in FIG. 4. Such chips are conveniently bonded to appropriate positions on the tape 43 of FIG. 3. In FIG. 4, four integrated circuit concentration chips 46—49 are illustrated and represent the diode rail area part 25' for the left-hand section of cable 43 for the case in which such cable section has 128 conductors. Those conductors are conveniently arranged into four 32 -conductor groups, and each conductor of a group is connected to a separate anode terminal for a different diode which is formed on the chip with a common cathode terminal. In FIG. 4 one of the four cathode leads 50 supplies a current path for a selected one of the 128 diodes. These four leads are the vertical connection leads 50 in FIG. 2 between the diode rails 11' and the selector switches 20 for the circuits depending from the front half of the plane 26. Slmilar leads and diode-integrated circuit chips are also provided in the diode rail area 25' at the right-hand end of cable 43 for serving the circuit array which depends from the rear edge of the plane 26 in FIG. 2.

In the application of the present invention to a magnetic memory of the type hereinbefore mentioned in regard to FIG. 2, an array of memory submodules are advantageously interconnected as illustrated in simplified form in FIG. 5 to be served by the same drive source 21. in FIG. 5 four submodules of the type described in connection with FIG. 2 are interconnected to share the same set of selection switches 19 for the word rails with word address selection signals being provided by a source 16'. The folded plane aspect of the various submodules is somewhat clearer in FIG. 5 wherein the diode rail area parts 25', 25' and the word rail area 24 comprise the folding edge of the folded plane. Each half of such folded plane in turn enfolds a planar array of digit circuits 32. Word rail buses 53 interconnect corresponding ones of the circuits 51 in the different submodules and are in turn connected to respective outputs of selection switches 19. Mechanical structures schematically represented by spacer blocks 44 and 45 hold each module in the illustrated folded plane configuration and space the submodules from one another.

The interconnection arrangement for the diode rail area 25 with the drive source 21 is hidden in the perspective view of FIG. 5 and is thus separately shown in FIG. 6. In the latter figure it is seen that the circuits 50 and 50' from the various submodules are coupled by selection units 57 through 60 to a single diode rail bus 56. Each selection unit, such as 57, and the group of selection switches 19 as a whole, is advantageously a set of charge storage diodes on a common circuit chip with a common electrode connection. Control of individual diodes for selection purposes in response to address information from sources 16' and 16'' is exercised by low-current transistor circuits in the manner illustrated in my copending application Ser. No. 679,817, filed Nov. 1, 1967, now U.S. Pat. No. 3,508,203, and entitled "Access Matrix with Charge Storage Diode Selection Swtiches." Thus, end connections between rail circuit driving points 27 and 28 and the drive source 21 include circuit concentrating arrangements which permit the single source 21 to drive all of the submodules in FIG. 5. The concentrating arrangements include the chips 46—49 and the switches 19 and 20.

In FIG. 6 the single output lead from each selection unit is connected to the common bus 56 which is made in an enlarged sheet, or tape, for direct connection to the drive source 21. The bus 56 has dimensions which are appropriate to cover an area that is the same as that defined by the word rail buses 53 to provide again the desired low inductance coupling between the drive source and the selection switches. End connections 50 and 50' for diode rails, and 51 for word rails, and their associated buses and selection switches are, thus, closely adjacent for low-loop circuit inductance and in a third plane which is perpendicular to both the matrix rail plane 26 and the two depending cross-point load planes.

Although the present invention has been described in connection with particular embodiments thereof, it is to be understood that additional embodiments and modifications which will be obvious to those skilled in the art are included within the spirit and scope of the invention.

What I claim is:

1. In combination,
a first set of electric circuits, each of said circuits having a driving point at a predetermined position thereon for applying drive signals thereto,
a second set of electric circuits, each of said second set circuits having a driving point at a predetermined position thereon for applying drive signals thereto, and
a plurality of interconnecting means each including at least a part of one circuit from each of said sets for interconnecting each drive point of a circuit of said first set with the drive point of each circuit of said second set through a different group of said interconnections,
at least a part of the interconnections of such group including first set circuit parts of different lengths, respectively, and
said lengths of said parts in each said interconnecting means bearing a predetermined relationship to one another to provide for said drive signals substantially the same electric circuit distance through said interconnecting means between driving points of any pair of interconnected circuits of said first and second sets so every interconnection between driving points presents substantially the same inductance to its driving points.

2. The combination in accordance with claim 1 in which
said driving points for each interconnected pair of said electric circuits are closely adjacent to one another, and
low inductance circuit means are provided for applying signals to said adjacent driving points.

3. The combination in accordance with claim 1 in which
said interconnecting means are grouped into pairs of circuits, and
means connect both circuits of any of said interconnecting means pairs at a common circuit position on a circuit of said first set.

4. The combination in accordance with claim 1 in which
means are provided to orient said first and second sets of circuits in substantially the same direction.

5. The combination in accordance with claim 1 in which
said electric circuits and said interconnecting means are formed in a unitary tapelike cable with said first and second sets of electric circuits extending across said cable and with said second set of circuits and said interconnecting means symmetrically arranged in two groups on either side of said circuits of said first set, and
means securing said cable in a folded plane configuration with the two groups of said interconnecting means arranged on opposite portions of the folded plane and with said first and second set of circuits arranged along the folding edge for said folded plane.

6. The combination in accordance with claim 1 in which
said interconnecting means each intersect at least one circuit of said first set, and
means are provided for connecting each of said interconnecting means to only one circuit of said first set and at an intersection therewith.

7. The combination in accordance with claim 6 in which
said first and second sets of circuits and said interconnecting means comprise a unitary planar tape,
the intersections of said interconnecting means and said circuit means are all located in a first predetermined part of said tape, and
a plurality of diodes connect said interconnecting means, respectively, to circuits of said second set, said diodes being secured to said tape in at least one further part of said tape remote from said first part.

8. The combination in accordance with claim 1 in which
said first and second sets of circuits and said interconnecting means comprise a unitary planar tape.

9. The combination in accordance with claim 8 in which
said tape further comprises a flexible substrate to which said circuits and interconnecting means are secured.

10. The combination in accordance with claim 8 in which
each of said interconnecting means includes a diode, all of such diodes being poled for forward conduction of current in the same direction with respect to their respective first set circuits, and
all of said diodes are secured to said tape.

11. The combination in accordance with claim 1 in which
said first and second sets of circuits lie in substantially the same first plane, and
said interconnecting means lie in substantially planar form perpendicularly from said first plane.

12. The combination in accordance with claim 11 in which
said interconnecting means are divided into two groups with pairs of circuits from each group connected in electrical series with one another.

13. The combination in accordance with claim 11 in which
said driving points of said first and second sets of circuits are at ends thereof which are all adjacent to one another,
end connections are provided to said driving points and all extend in substantially planar form perpendicularly with respect to both said first plane and said interconnecting means, and
means connected to said end connections for applying drive signals to a selectable pair of said electric circuits.

14. The combination in accordance with claim 13 in which
said end connections include circuit concentrating means selectably controllable for applying drive signals to a predetermined one of said circuit pairs.

15. The combination in accordance with claim 1 in which
said interconnecting means comprise for each interconnection between a pair of said electric circuit driving points,
circuit means connected between a position on a first circuit of said pair at a first predetermined distance from the driving point of such circuit and a position on a second circuit of said pair at a second predetermined distance from the driving point of such second circuit, and
said first and second predetermined distances are complements of one another with respect to a predetermined total distance which is the same for each interconnected pair of said electric circuits.

16. The combination in accordance with claim 15 in which
said circuit means includes
a load circuit coupled by low inductance means to a pair of closely adjacent circuit terminals, and
circuit leads of substantially equal length interconnect said pair of adjacent circuit terminals to said positions of the last-mentioned circuit pair for defining an electric circuit loop between said adjacent circuit terminals and said driving points of said last-mentioned circuit pair, which loop encloses a predetermined area, said area being substantially the same size for each interconnected pair of said electric circuits.

17. The combination in accordance with claim 16 in which
said circuit loop has a triangular configuration.

18. The combination in accordance with claim 16 in which said driving points for each interconnected pair of said electric circuits are closely adjacent to one another, and low-inductance circuit means are provided for applying signals to said adjacent driving points.

19. The combination in accordance with claim 18 in which said electric circuits and said interconnecting means are formed in a unitary cable structure of symmetrical configuration with respect to one of said electric circuit sets.